United States Patent
Sonderman et al.

(10) Patent No.: US 6,650,955 B1
(45) Date of Patent: Nov. 18, 2003

(54) METHOD AND APPARATUS FOR DETERMINING A SAMPLING PLAN BASED ON PROCESS AND EQUIPMENT FINGERPRINTING

(75) Inventors: Thomas J. Sonderman, Austin, TX (US); Alexander J. Pasadyn, Austin, TX (US); Christopher A. Bode, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 127 days.

(21) Appl. No.: 10/024,675

(22) Filed: Dec. 18, 2001

(51) Int. Cl.[7] ............................................. G06F 19/00
(52) U.S. Cl. ..................... 700/108; 700/109; 700/110; 702/83; 438/14; 438/16; 438/17; 438/18
(58) Field of Search ................................. 700/108, 109, 700/110; 702/83; 438/14, 16, 17, 18

(56) References Cited

U.S. PATENT DOCUMENTS

| | | | | |
|---|---|---|---|---|
| 5,402,367 A | * | 3/1995 | Sullivan et al. ................. 703/6 |
| 5,586,039 A | * | 12/1996 | Hirsch et al. .................. 700/95 |
| 5,657,252 A | * | 8/1997 | George ......................... 702/83 |
| 5,999,003 A | * | 12/1999 | Steffan et al. ............... 324/537 |
| 6,002,989 A | * | 12/1999 | Shiba et al. .................... 702/84 |
| 6,263,255 B1 | * | 7/2001 | Tan et al. .................... 700/121 |
| 6,281,962 B1 | * | 8/2001 | Ogata et al. .................... 355/27 |
| 6,408,219 B2 | * | 6/2002 | Lamey et al. ................. 700/110 |
| 6,421,574 B1 | * | 7/2002 | Steffan et al. ............... 700/121 |
| 6,477,432 B1 | * | 11/2002 | Chen et al. .................... 700/51 |
| 6,577,972 B2 | * | 6/2003 | Yanaru et al. ................. 702/83 |

\* cited by examiner

Primary Examiner—Albert W. Paladini
Assistant Examiner—Michael D. Masinick
(74) Attorney, Agent, or Firm—Williams, Morgan & Amersen

(57) ABSTRACT

A processing line includes a processing tool, a metrology tool, a processing monitor, and a sampling controller. The processing tool is configured to process workpieces. The metrology tool is configured to measure an output characteristic of selected workpieces in accordance with a sampling plan. The processing monitor is configured to monitor the processing of at least one workpiece in the processing tool to generate a fingerprint and determine a processing metric based on the fingerprint. The sampling controller is configured to receive the processing metric and determine the sampling plan for the metrology tool based on the processing metric. A method for processing workpieces includes processing a plurality of workpieces in a processing tool. A characteristic of selected workpieces is measured in accordance with a sampling plan. The processing of at least one workpiece in the processing tool is monitored to generate a fingerprint. A processing metric is determined based on the fingerprint. The sampling plan is determined based on the processing metric.

37 Claims, 3 Drawing Sheets

METHOD AND APPARATUS FOR DETERMINING A SAMPLING PLAN BASED ON PROCESS AND EQUIPMENT FINGERPRINTING

BACKGROUND OF THE INVENTION

1. Field of the Invention

This invention relates generally to semiconductor device manufacturing, and, more particularly, to a method and apparatus for determining a sampling plan based on process and equipment fingerprinting.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

Data gathered during the course of wafer processing is used to identify and attempt to mitigate the effects of process and equipment variations by implementing automatic control techniques based on the collected feedback. Current semiconductor processing techniques typically collect metrology data at a fixed rate (e.g., every fourth lot processed in a tool) or by pre-assigning a fixed percentage of lots for measurement. Because lots are not typically processed in a particular order, the percentage technique sometimes results in periods where multiple lots are measured consecutively, followed by periods where no lots are measured. Such static sampling plans sometimes do not diagnose process or system issues expeditiously. As a result defective wafers could be manufactured, necessitating costly rework or scrapping of the wafers.

Static sampling plans also sometimes fail to provide adequate data for effective process control. For a fluctuating process, the sampling frequency may not be sufficient to provide adequate feedback for implementing a control methodology for reducing the variation. On the other hand, for a stable process, a static sampling plan may result in the collection of more data than is required, thus reducing the efficiency of the fabrication process. For a stable process, few control actions are typically taken, and the metrology data collected is generally analyzed to identify a departure from the stable condition.

The present invention is directed to overcoming, or at least reducing the effects of, one or more of the problems set forth above.

SUMMARY OF THE INVENTION

One aspect of the present invention is seen in a processing line including a processing tool, a metrology tool, a processing monitor, and a sampling controller. The processing tool is configured to process workpieces. The metrology tool is configured to measure an output characteristic of selected workpieces in accordance with a sampling plan. The processing monitor is configured to monitor the processing of at least one workpiece in the processing tool to generate a fingerprint and determine a processing metric based on the fingerprint. The sampling controller is configured to receive the processing metric and determine the sampling plan for the metrology tool based on the processing metric.

Another aspect of the present invention is seen in a method for processing workpieces. The method includes processing a plurality of workpieces in a processing tool. A characteristic of selected workpieces is measured in accordance with a sampling plan. The processing of at least one workpiece in the processing tool is monitored to generate a fingerprint. A processing metric is determined based on the fingerprint. The sampling plan is determined based on the processing metric.

BRIEF DESCRIPTION OF THE DRAWINGS

The invention may be understood by reference to the following description taken in conjunction with the accompanying drawings, in which like reference numerals identify like elements, and in which.

Figure 1:
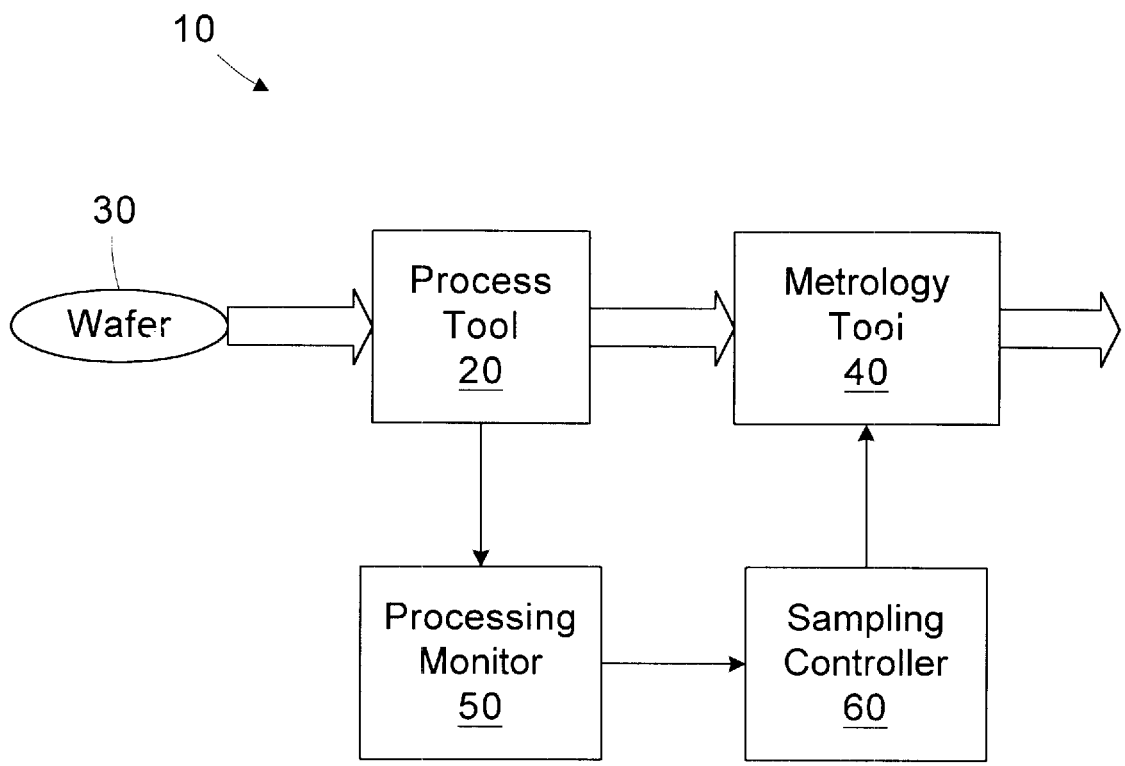
FIG. 1 is a simplified block diagram of a processing line in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Turning now to the figures, and, in particular, to FIG. 1, a simplified block diagram of a processing line 10 in accordance with one illustrative embodiment of the present invention is provided. The processing line 10 includes a processing tool 20 for processing semiconductor wafers 30 and a metrology tool 40 for measuring output characteristics of some of the wafers 30 processed by the processing tool 20 to measure the efficacy of the process implemented by the processing tool 20.

A processing monitor 50 monitors the processes performed by the processing tool 20 to determine a processing metric based on the particular characteristics of the processing tool 20 observed during a particular run. A sampling controller 60 interfaces with the processing monitor 50 and determines a sampling plan for the metrology tool 40 based on the processing metric associated with the processing of the wafers 30 in the processing tool 20. Although the processing monitor 50 and sampling controller 60 are illustrated as separate units, they may be combined into a single unit in some embodiments. Also, the metrology tool 40 may be remote from the processing tool 20 as shown, or alternatively, the metrology tool 40 may be integrated with the processing tool 20 (i.e., in situ). Similarly, the sampling controller 60 may be integrated with the metrology tool 40, and/or the processing monitor 50 may be integrated with the processing tool 20.

The particular process performed by the processing tool 20 and the particular output characteristic measured by the metrology tool 40 may vary widely. Various illustrative examples will be described in greater detail hereinafter; however, the application of the present invention is not limited to the particulars described in such examples. Rather, the instant invention is applicable to a wide variety of processing tools 20 related or not to semiconductor processing, and the output characteristic measured may be selected from a wide range of output characteristics applicable to the particular product being processed or the particular process being performed.

The sampling controller 60 determines a sampling plan for the metrology tool 40 based on the processing metric determined by the processing monitor 50 during the processing of a wafer 30 or wafers 30 in the processing tool 20. Depending on the particular nature of the processing tool 20, it may process single wafers 30, a group or lot of wafers 30, or a plurality of lots of wafers 30 (i.e., a batch). As will be described in greater detail below, the particular sampling plan determined by the sampling controller 60 depends at least in part on the number of wafers 30 processed concurrently.

The processing monitor 50 collects tool state trace data, also referred to as fingerprint data, during a processing run of the processing tool 20. The collection of tool state trace data for a particular run is referred to as a fingerprint, because it represents the unique conditions under which the run progressed. One processing run may be distinguished from another based on their respective fingerprints.

The particular tool state information collected to generate the fingerprint data depends on the specific process performed by the processing tool 20. For example, exemplary tool state data for a copper polishing tool may include polish time, polishing arm downforce, polishing pad speed, motor current, polishing arm oscillation magnitude and frequency, slurry chemical composition, temperature, etc. Exemplary tool state data for a copper plating tool may include plating time, electrolyte bath chemical composition, electrolyte bath temperature, voltage, etc. Exemplary tool state trace data for a rapid thermal processing tool may include wafer temperature, chamber temperature, power consumption, power consumption changes, pressure, exhaust gas chemistry, etc.

The output characteristic measured by the metrology tool 40 to gauge the efficacy of the processing tool 20 may include parameters such as, but not limited to, process layer thickness, critical dimensions, degree of dishing, defect count, resistivity, etc. Again, the specific output characteristic measured depends on the nature of the processing tool 20 and the particular process bring performed.

The processing monitor 50 determines the processing metric based on the fingerprint data collected during a processing run. The purpose of the processing metric is to differentiate between the wafers processed during different processing runs. There need not necessarily be a direct correlation between the processing metric and the quality of the process performed during the run, however, in some embodiments, such a correlation may exist.

Figure 2:
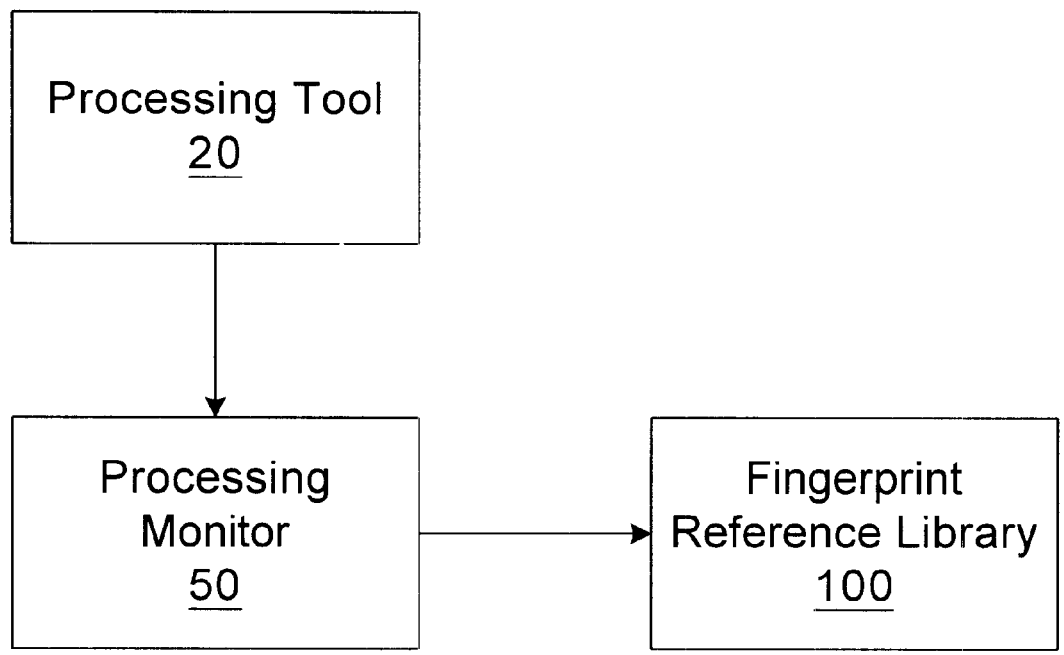
FIG. 2 is a simplified block diagram of a processing monitor interfacing with a processing tool in the processing line of FIG. 1.

Turning now to FIG. 2, a simplified block diagram of the processing monitor 50 interfacing with the processing tool 20 and with a fingerprint reference library 100 is shown. The fingerprint library 100 includes a plurality of reference sets of fingerprint data generated from previous processing runs of the processing tool 20. Each fingerprint entry may include tool operating parameters, environmental conditions, operating recipe parameters, etc. collected during the associated processing run. The fingerprint entry may also include mathematically processed data, such as an average tool parameter (e.g., average temperature) or an integrated parameter (e.g., integrated voltage). An exemplary commercial software application suitable for gathering and tracking tool state trace data is the ModelWare™ software application offered by Triant, Inc. of Vancouver, Canada.

Each reference trace in the fingerprint reference library 100 has an associated processing metric. After a wafer 30 or group of wafers 30 is processed in the processing tool 20, the processing monitor 50 compares the current fingerprint data to the reference traces in the fingerprint reference library 100 and determines the reference trace closest to the current trace to identify the processing metric. Various techniques for matching the current trace to a reference trace are well known to those of ordinary skill in the art. For example, a minimum least squares technique or a nearest neighbor technique may be employed.

In another embodiment, the processing metric may be determined by predicting the tool state variable values expected during the processing run based on the conditions of the processing tool 20 and the operating recipe being implemented. The measured fingerprint data may be compared to the predicted tool state variable values, and the magnitude of the processing metric may be related to the difference therebetween. For example, if the measured and predicted fingerprints matched exactly, the processing metric may be 1.0 or 100%. The greater the difference between the measured and predicted fingerprints, the lower the value of the processing metric.

The processing monitor 50 passes the processing metric determined using one of the methods illustrated above to the sampling controller 60, which in turn uses the processing metric to determine a sampling plan for the metrology tool 40. In one embodiment, the processing metric values may be grouped into bins based on their magnitudes (i.e., each bin encompasses a range of processing metric values). Each bin has an associated sampling plan. After receiving the processing metric from the processing monitor 50, the sampling controller 60 determines which bin encompasses the wafer (s) processed by the processing tool 20 and accesses the predetermined sampling plan for that bin. In another embodiment, each processing metric may have its own associated sampling plan.

The specific detail for the sampling plans may be developed based on historical data collected regarding the characteristics of the wafers in each bin. For example, if a particular bin normally has an associated output characteristic that has been historically stable, the sampling plan may specify that a reduced number of wafers associated with the bin be sampled by the metrology tool 40. However, if the particular bin has been determined to be less stable or of lower quality, the sampling plan may dictate that an increased number of wafers be measured.

The scale on which the sampling plan is implemented depends on the particular nature of the processing tool 20. If the processing tool 20 processes single wafers 30, the sampling plan may specify the frequency at which wafers 30 processed by the processing tool 20 are measured by the metrology tool 40. The processing metric in such an embodiment provides a measure of the stability of the processing tool 20. If the processing metric is associated with a degrading stability, the frequency at which wafers are measured by the metrology tool 20 may be increased. In another embodiment, if the processing tool 20 processes lots or batches (i.e., multiple lots) of wafers 30, the sampling plan may specify the number of wafers 30 in the particular lot or batch associated with the processing metric that is to be measured. For example, for a lot or batch with a processing metric indicating a higher expected degree of stability or quality, the metrology tool 40 may measure 10% of the wafers 30, while for a lot or batch with a processing metric indicating a lower expected degree of stability or quality, the metrology tool 40 may measure 30% of the wafers 30.

Figure 3:
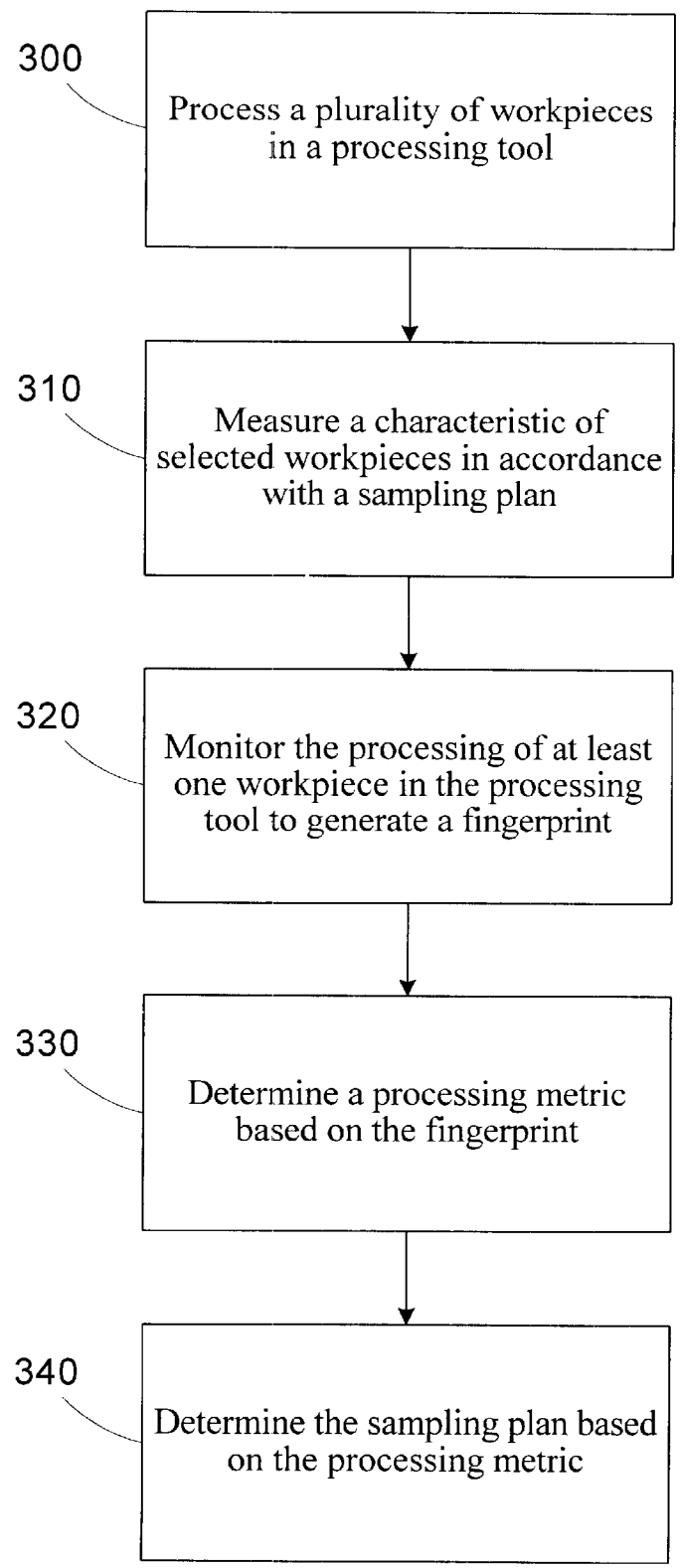
FIG. 3 is a flow diagram of a method for determining a sampling plan based on process and equipment fingerprinting in accordance with another illustrative embodiment of the present invention.

Turning now to FIG. 3, a flow diagram of a method for determining a sampling plan based on process and equipment fingerprinting in accordance with another illustrative embodiment of the present invention is provided. In block 300, a plurality of workpieces is processed in a processing tool. In block 310, a characteristic of selected workpieces is measured in accordance with a sampling plan. In block 320, the processing of at least one workpiece in the processing tool is monitored to generate a fingerprint. In block 330, a processing metric is determined based on the fingerprint. In block 340, the sampling plan is determined based on the processing metric.

In general, adaptively changing the sampling plan implemented by the metrology tool 40, as described above, increases the efficiency of the processing line 10. For stable processes, the amount of metrology resources expended may be reduced. This reduction increases the throughput of the processing line 10. In situations where stability is decreased, the amount of metrology data collected may be increased to facilitate better process control and/or fault detection and correction. Changes in the sampling plans may be used to trigger an alert or message to an operator of the processing tool 20 to evaluate the changing conditions and possibly schedule a maintenance task.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A processing line, comprising:
- a processing tool configured to process workpieces;
- a metrology tool configured to measure an output characteristic of selected workpieces in accordance with a sampling plan;
- a processing monitor configured to monitor the processing of at least one workpiece in the processing tool to generate a fingerprint and determine a processing metric based on the fingerprint; and
- a sampling controller configured to receive the processing metric and determine the sampling plan for the metrology tool based on the processing metric.

2. The processing line of claim 1, wherein the processing monitor is further configured to collect tool state trace data associated with the processing of the at least one workpiece in the processing tool to generate the fingerprint.

3. The processing line of claim 1, wherein the processing monitor is further configured to compare the generated fingerprint to a library of reference fingerprints, each reference fingerprint having an associated processing metric, and select the reference fingerprint closest to the generated fingerprint to identify the processing metric to provide to the sampling controller.

4. The processing line of claim 1, wherein the processing monitor is further configured to generate an expected fingerprint associated with the processing of the at least one workpiece, compare the expected fingerprint with the generated fingerprint, and determine the processing metric based on the comparison.

5. The processing line of claim 1, wherein the processing tool is configured to process single workpieces, and the sampling plan comprises a sampling frequency for measuring subsequent workpieces processed in the processing tool.

6. The processing line of claim 1, wherein the processing tool is configured to concurrently process a set of workpieces, and the sampling plan comprises a number of workpieces in the set to be measured by the metrology tool.

7. The processing line of claim 1, wherein the workpieces comprise semiconductor wafers.

8. The processing line of claim 1, wherein the sampling controller is configured to define a plurality of bins, each bin having an associated range of processing metric values, associate the processing metric with one of the bins having a range encompassing the processing metric, and determine the sampling plan based on the associated bin.

9. A processing line, comprising:
- a processing tool configured to process workpieces;
- a metrology tool configured to measure an output characteristic of selected workpieces in accordance with a sampling plan;
- a processing monitor configured to collect tool state trace data during the processing of at least one workpiece in the processing tool to generate a fingerprint, compare the generated fingerprint to a library of reference fingerprints, each reference fingerprint having an associated processing metric, and select the reference fingerprint closest to the generated fingerprint to identify a processing metric; and
- a sampling controller configured to receive the processing metric and determine the sampling plan for the metrology tool based on the processing metric.

10. The processing line of claim 9, wherein the processing tool is configured to process single workpieces, and the sampling plan comprises a sampling frequency for measuring subsequent workpieces processed in the processing tool.

11. The processing line of claim 9, wherein the processing tool is configured to concurrently process a set of workpieces, and the sampling plan comprises a number of workpieces in the set to be measured by the metrology tool.

12. The processing line of claim 9, wherein the workpieces comprise semiconductor wafers.

13. The processing line of claim 9, wherein the sampling controller is configured to define a plurality of bins, each bin having an associated range of processing metric values, associate the processing metric with one of the bins having a range encompassing the processing metric, and determine the sampling plan based on the associated bin.

14. A processing line, comprising:
- a processing tool configured to process workpieces;
- a metrology tool configured to measure an output characteristic of selected workpieces in accordance with a sampling plan;
- a processing monitor configured to collect tool state trace data during the processing of at least one workpiece in the processing tool to generate a fingerprint, generate an expected fingerprint associated with the processing of the at least one workpiece, compare the expected fingerprint with the generated fingerprint, and determine a processing metric based on the comparison; and
- a sampling controller configured to receive the processing metric and determine the sampling plan for the metrology tool based on the processing metric.

15. The processing line of claim 14, wherein the processing tool is configured to process single workpieces, and the sampling plan comprises a sampling frequency for measuring subsequent workpieces processed in the processing tool.

16. The processing line of claim 14, wherein the processing tool is configured to concurrently process a set of workpieces, and the sampling plan comprises a number of workpieces in the set to be measured by the metrology tool.

17. The processing line of claim 14, wherein the workpieces comprise semiconductor wafers.

18. The processing line of claim 14, wherein the sampling controller is configured to define a plurality of bins, each bin having an associated range of processing metric values, associate the processing metric with one of the bins having a range encompassing the processing metric, and determine the sampling plan based on the associated bin.

19. A method for processing workpieces, comprising:
- processing a plurality of workpieces in a processing tool;
- measuring a characteristic of selected workpieces in accordance with a sampling plan;
- monitoring the processing of at least one workpiece in the processing tool to generate a fingerprint;
- determining a processing metric based on the fingerprint; and
- determining the sampling plan based on the processing metric.

20. The method of claim 19, wherein monitoring the processing of the at least one workpiece further comprises collecting tool state trace data associated with the processing of the at least one workpiece in the processing tool to generate the fingerprint.

21. The method of claim 19, wherein monitoring the processing of the at least one workpiece further comprises comparing the generated fingerprint to a library of reference fingerprints, each reference fingerprint having an associated processing metric, and selecting the reference fingerprint closest to the generated fingerprint to identify the processing metric.

22. The method of claim 19, wherein monitoring the processing of the at least one workpiece further comprises generating an expected fingerprint associated with the processing of the at least one workpiece, comparing the expected fingerprint with the generated fingerprint, and determining the processing metric based on the comparison.

23. The method of claim 19, wherein the processing tool is configured to process single workpieces, and determining the sampling plan further comprises determining a sampling frequency for measuring subsequent workpieces processed in the processing tool.

24. The method of claim 19, wherein the processing tool is configured to concurrently process a set of workpieces, and determining the sampling plan further comprises determining a number of workpieces in the set to be measured by the metrology tool.

25. The method of claim 19, wherein processing the workpieces further comprises processing semiconductor wafers.

26. The method of claim 19, wherein determining the sampling plan further comprises:

defining a plurality of bins, each bin having an associated range of processing metric values;

associating the processing metric with one of the bins having a range encompassing the processing metric; and determining the sampling plan based on the associated bin.

27. A method for processing workpieces, comprising:

processing a plurality of workpieces in a processing tool;

measuring a characteristic of selected workpieces in accordance with a sampling plan;

collecting tool state trace data associated with the processing of at least one workpiece in the processing tool to generate a fingerprint;

comparing the generated fingerprint to a library of reference fingerprints, each reference fingerprint having an associated processing metric;

selecting the reference fingerprint closest to the generated fingerprint to identify a processing metric; and determining the sampling plan based on the processing metric.

28. The method of claim 27, wherein the processing tool is configured to process single workpieces, and determining the sampling plan further comprises determining a sampling frequency for measuring subsequent workpieces processed in the processing tool.

29. The method of claim 27, wherein the processing tool is configured to concurrently process a set of workpieces, and determining the sampling plan further comprises determining a number of workpieces in the set to be measured by the metrology tool.

30. The method of claim 27, wherein processing the workpieces further comprises processing semiconductor wafers.

31. The method of claim 27, wherein determining the sampling plan further comprises:

defining a plurality of bins, each bin having an associated range of processing metric values;

associating the processing metric with one of the bins having a range encompassing the processing metric; and determining the sampling plan based on the associated bin.

32. A method for processing workpieces, comprising:

processing a plurality of workpieces in a processing tool;

measuring a characteristic of selected workpieces in accordance with a sampling plan;

collecting tool state trace data associated with the processing of at least one workpiece in the processing tool to generate a fingerprint;

generating an expected fingerprint associated with the processing of the at least one workpiece;

comparing the expected fingerprint with the generated fingerprint;

determining a processing metric based on the comparison;

determining the sampling plan based on the processing metric.

33. The method of claim 32, wherein the processing tool is configured to process single workpieces, and determining the sampling plan further comprises determining a sampling frequency for measuring subsequent workpieces processed in the processing tool.

34. The method of claim 32, wherein the processing tool is configured to concurrently process a set of workpieces, and determining the sampling plan further comprises determining a number of workpieces in the set to be measured by the metrology tool.

35. The method of claim 32, wherein processing the workpieces further comprises processing semiconductor wafers.

36. The method of claim 32, wherein determining the sampling plan further comprises:

defining a plurality of bins, each bin having an associated range of processing metric values;

associating the processing metric with one of the bins having a range encompassing the processing metric; and determining the sampling plan based on the associated bin.

37. An apparatus, comprising:

means for processing a plurality of workpieces;

means for measuring a characteristic of selected workpieces in accordance with a sampling plan;

means for monitoring the processing of at least one workpiece to generate a fingerprint;

means for determining a processing metric based on the fingerprint; and means for determining the sampling plan based on the processing metric.

\* \* \* \* \*